US008780747B2

(12) United States Patent
Seo et al.

(10) Patent No.: US 8,780,747 B2
(45) Date of Patent: Jul. 15, 2014

(54) METHOD FOR CONTROLLING UPLINK ACCESS IN WIRELESS COMMUNICATION SYSTEM

(75) Inventors: Han Byul Seo, Anyang-si (KR); Seon Wook Kim, Seoul (KR); Min Soo Na, Seoul (KR); Sung Hyun Choi, Seoul (KR); Seo Shin Kwack, Gwacheon-si (KR)

(73) Assignees: LG Electronics Inc., Seoul (KR); SNU R & DB Foundation, Seoul (KR)

( * ) Notice: Subject to any disclaimer, the term of this patent is extended or adjusted under 35 U.S.C. 154(b) by 455 days.

(21) Appl. No.: 13/266,239

(22) PCT Filed: Apr. 30, 2010

(86) PCT No.: PCT/KR2010/002740
§ 371 (c)(1),
(2), (4) Date: Oct. 25, 2011

(87) PCT Pub. No.: WO2010/126327
PCT Pub. Date: Nov. 4, 2010

(65) Prior Publication Data
US 2012/0051251 A1 Mar. 1, 2012

(30) Foreign Application Priority Data
Apr. 30, 2009 (KR) .......................... 10-2009-0038016

(51) Int. Cl.
*H04L 1/00* (2006.01)
*H04L 12/26* (2006.01)
(52) U.S. Cl.
CPC .................................. *H04L 43/0847* (2013.01)
USPC ............................ 370/252; 370/447; 370/462
(58) Field of Classification Search
CPC ................................................. H04L 43/0847

USPC .......................................... 370/252, 447, 462
See application file for complete search history.

(56) References Cited

U.S. PATENT DOCUMENTS

| 5,729,542 A * | 3/1998 | Dupont .......................... 370/346 |
| 2002/0034258 A1* | 3/2002 | Kuzminskiy et al. .......... 375/267 |
| 2008/0063106 A1* | 3/2008 | Hahm et al. .................. 375/267 |
| 2011/0021232 A1* | 1/2011 | Kazmi et al. .................. 455/509 |

FOREIGN PATENT DOCUMENTS

| KR | 1020080043159 | 5/2008 |
| KR | 1020080094528 | 10/2008 |
| WO | 2006/042784 | 4/2006 |

\* cited by examiner

*Primary Examiner* — Wanda Z Russell
(74) *Attorney, Agent, or Firm* — Lee, Hong, Degerman, Kang & Waimey

(57) ABSTRACT

A method of controlling uplink access in a wireless communication system is provided. The method includes: generating an access probability sequence consisting of an access probability determined with respect to a radio resource used for data transmission; transmitting data according to the access probability included in the access probability sequence; receiving a success/failure result on the data transmission; and regulating the access probability used in the data transmission according to the success/failure result. Accordingly, each user equipment performs a simple control process for attempting random uplink access according to an access probability sequence and for changing the access probability sequence according to success/failure of uplink data transmission, thereby decreasing a probability of collision between user equipments, thereby increasing data transmission efficiency in a system employing a plurality of user equipments.

12 Claims, 11 Drawing Sheets

METHOD FOR CONTROLLING UPLINK ACCESS IN WIRELESS COMMUNICATION SYSTEM

CROSS-REFERENCE TO RELATED APPLICATIONS

This application is a 371 U.S. national stage application of International Application No. PCT/KR2010/002740, filed on Apr. 30, 2010, which claims priority to Korean Application Serial No. 10-2009-0038016, filed on Apr. 30, 2009, the contents of which are incorporated by reference herein in their entirety.

TECHNICAL FIELD

The present invention relates to wireless communications, and more particularly, to a method of controlling uplink access of a user equipment in a wireless communication system.

BACKGROUND ART

Spatial division multiple access (SDMA) is a technique for the effective use of finite frequency resources in a wireless communication system. The SDMA is a method of allowing a plurality of user equipments (UEs) to simultaneously access a base station (BS) by using a spatial channel property of UEs that can be spatially divided. The SDMA can be used for system performance improvement in a system in which the BS employs a plurality of antennas and each EU employs at least one antenna.

Examples of the conventional method for implementing the SDMA will be described below.

1) In one method, each UE transmits a preamble before data transmission and the BS estimates a channel of each UE by using the received preamble, and then the BS implements the SDMA by performing beamforming so that as many messages as possible can be received when several UEs performs channel access according to an estimated channel state.

2) In another method, under the assumption that the BS knows channel information of UEs desiring channel access, a signal to interference and noise ratio (SINR) is calculated for a case where all or some of UEs access the channel in one time slot, and the UEs are allocated to the time slot so that an SINR of each time slot satisfies a threshold.

3) In another method, UEs capable of simultaneously receiving services are grouped according to a metric determined by the BS under the assumption that the BS entirely knows channel information of each UE.

In the above description, the method 1) is inferior in performance to the method of controlling channel access by grouping the UEs capable of performing channel access.

In the method 2) and the method 3), in order to know channel information of each UE, the BS has to receive a channel request message as well as information indicating whether each UE desires channel access. Further, after grouping the UEs capable of performing simultaneous channel access, the BS has to report a group of each UE through a downlink to each UE. Such a process requires a lot of resources. In addition, as the number of UEs increases, a computational complexity also increases in the grouping of the UEs, which results in the increase of time delay.

SUMMARY OF INVENTION

Technical Problem

The present invention relates to a method of controlling uplink access for the effective use of spatial division multiple access (SDMA) in a wireless communication system.

Solution to Problem

According to an aspect of the present invention, a method of controlling uplink access in a wireless communication system is provided. The method includes: generating an access probability sequence consisting of an access probability determined with respect to a radio resource used for data transmission; transmitting data according to the access probability included in the access probability sequence; receiving a success/failure result on the data transmission; and regulating the access probability used in the data transmission according to the success/failure result.

According to another aspect of the present invention, a method of controlling uplink access in a wireless local area network (WLAN) system is provided. The method includes: determining whether a clear-to-send (CTS) signal is received; if the CTS signal is received, determining a channel correlation with a different user equipment by using the CTS signal; generating an access probability for the different user equipment as a probability of accessing a channel at a time of transmitting data by the different user equipment according to the channel correlation; and transmitting the data according to the access probability for the different user equipment.

In the aforementioned aspect of the present invention, the method further includes: receiving a success/failure result on the data transmission; and regulating the access probability for the different user equipment according to the success/failure result.

Advantageous Effects of Invention

According to the present invention, each user equipment performs a simple control process for attempting random uplink access according to an access probability sequence and for changing the access probability sequence according to success/failure of uplink data transmission, thereby decreasing a probability of collision between user equipments. Since each user equipment regulates the access probability sequence, user equipments having a high channel correlation have a high probability of channel access at different time points, thereby increasing data transmission efficiency in a system employing a plurality of user equipments.

MODE FOR THE INVENTION

Hereinafter, an uplink denotes communication from a user equipment (UE) to a base station (BS), and a downlink denotes communication from the BS to the UE. In the uplink, a transmitter may be a part of the UE, and a receiver may be a part of the BS. In the downlink, the transmitter may be a part of the BS, and the receiver may be a part of the UE. The UE may be fixed or mobile, and may be referred to as another terminology, such as a mobile station (MS), a user terminal (UT), a subscriber station (SS), a wireless device, etc. The BS is generally a fixed station that communicates with the UE and may be referred to as another terminology, such as a node-B, a base transceiver system (BTS), an access point, etc.

Figure 1:
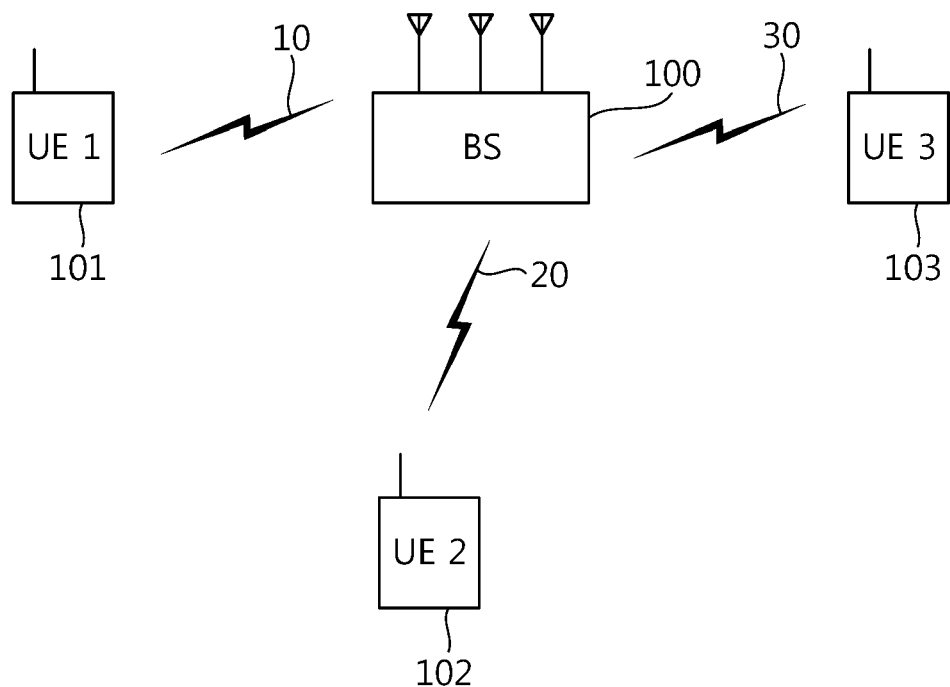
FIG. 1 shows a structure of a wireless communication system according to an embodiment of the present invention.

FIG. 1 shows a structure of a wireless communication system according to an embodiment of the present invention.

Referring to FIG. 1, the wireless communication system includes a BS 100 and a plurality of UEs 101, 102, and 103. Three UEs are shown in FIG. 1 as an example.

In the wireless communication system of the present embodiment, the BS 100 may use M antennas, where M is a natural number greater than or equal to 2. Thus, the BS 100 can communicate simultaneously with a plurality of UEs having a low channel correlation without collision. For example, when the three UEs 101, 102, and 103 communicate with the BS by using the same frequency, if a channel 10 between the BS 100 and the UE1 101 and a channel 20 between the BS 100 and the UE2 102 have a low probability of occurrence of mutual interference, that is, if a channel correlation is low, the BS 100 can communicate simultaneously with the UE1 101 and the UE2 102 without collision. Otherwise, if the channel 10 between the BS 100 and the UE1 101 and a channel 30 between the BS 101 and the UE3 103 have a high probability of occurrence of mutual interference, that is, if a channel correlation is high, communication performed by the BS 100 simultaneously with the UE1 101, and the UE3 103 results in collision occurrence. Therefore, although the UE1 101 and the UE2 102 can simultaneously access a channel without any problem, it is preferable that the UE1 101 and the UE3 103 access the channel at different time points.

In the wireless communication system of the present embodiment, each UE transmits data by accessing a channel to the BS according to an access probability. Herein, the channel is the concept of a communication path between the BS and the UE. Further, the access probability is defined as a probability indicating whether each UE will transmit data by accessing an uplink channel. The access probability can be defined with respect to each radio resource. For example, the radio resource may be any one type of a time slot, a frequency, and a code.

A case where the access probability is defined with respect to the time slot will be described hereinafter as an example.

Figure 2:
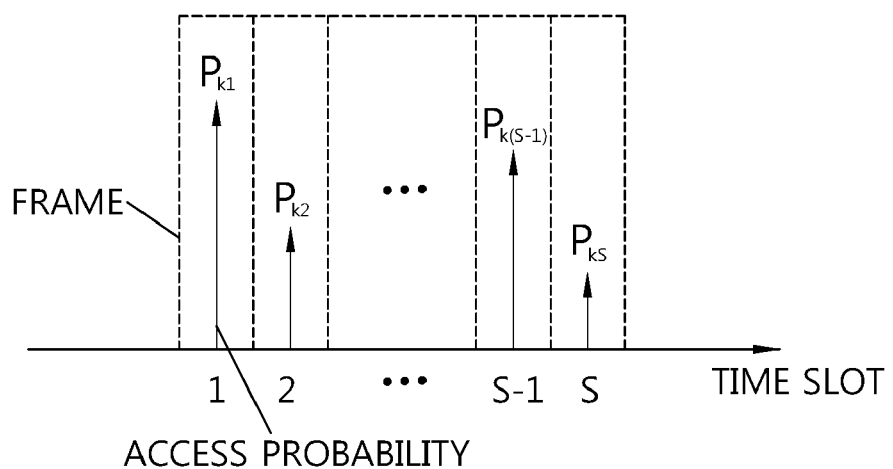
FIG. 2 shows an access probability assigned to a time slot.

FIG. 2 shows an access probability assigned to a time slot.

Referring to FIG. 2, one frame consists of a plurality of time slots. The access probability is defined with respect to each of all time slots constituting one frame. In FIG. 2, one frame consists of S time slots, and S access probabilities are present.

The number of access probabilities generated by each UE is the same as the number of time slots constituting one frame. A sequence consisting of the plurality of access probabilities is hereinafter referred to as an access probability sequence. A length of the access probability sequence is determined by the number of time slots constituting one frame. For example, if one frame consists of S time slots (herein, S is any natural constant greater than or equal to 2), the length of the access probability sequence is S.

If an access probability sequence of a UE k is denoted by $P_k$, $P_k$ can be expressed by Equation 1.

$$P_k = [P_{k1}\ P_{k2}\ \ldots\ P_{kj}\ \ldots\ P_{kS}] \qquad [\text{Math.1}]$$

In Equation 1, S is any natural constant greater than or equal to 2, and j is a variable (1≤j≤S, where j is a natural number), and the same is also true hereinafter. In Equation 1, $P_{kj}$, denotes an access probability of the UE k for a $j^{th}$ time slot in one frame. For example, $P_{k1}$, denotes an access probability of the UE k for a $1^{st}$ time slot in a frame, and $P_{kS}$ denotes an access probability of the UE k for an $S^{th}$ time slot in the frame. The S access probabilities are defined randomly in an initial time at which the UE k starts its operation. The UE k transmits data by using an access probability sequence consisting of the S access probabilities. For example, if the UE k has data to be transmitted in the $j^{th}$ time slot, whether to transmit data is determined with a probability of $P_{kj}$. If the UE k transmits no data in the $j^{th}$ time slot, whether to transmit data is determined with a probability of $P_{k(j+1)}$ in a next time slot, i.e., a $(j+1)^{th}$ time slot. The UE k regulates an access probability according to whether data is transmitted and according to success/failure of data transmission.

Figure 3:
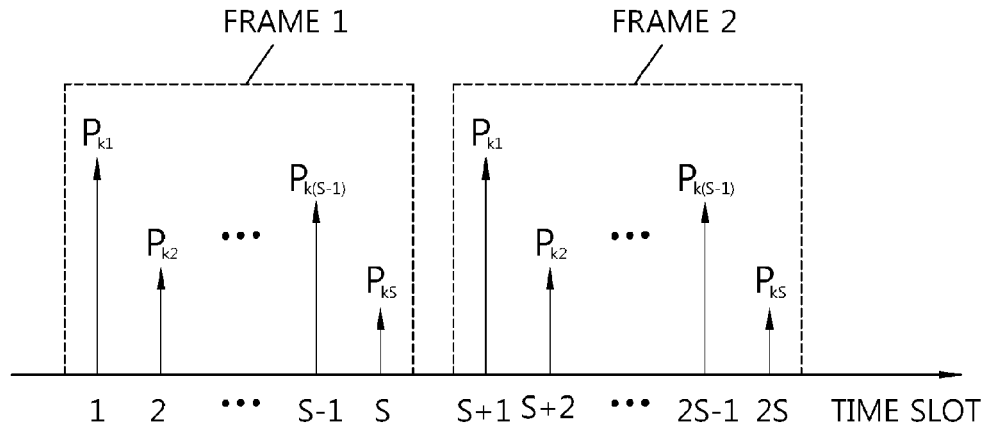
FIG. 3 shows an access probability change in a next frame when a user equipment (UE) does not attempt data transmission in one frame.

FIG. 3 shows an access probability change in a next frame when a UE does not attempt data transmission in one frame.

Referring to FIG. 3, if the UE does not attempt data transmission in a specific frame, the same access probability is used in a next frame without being updated. For example, if a UE k does not attempt data transmission in all time slots of a frame 1, an access probability $P_{k1}$, of a $1^{st}$ time slot of the frame 1 is equally used as an access probability of a time slot S+1, i.e., a $1^{st}$ time slot of a frame 2. Likewise, if an access probability of an $S^{th}$ time slot of the frame 1 of the UE k is denoted by $P_{kS}$, an access probability of a time slot 2S, i.e., an $S^{th}$ time slot of the frame 2 is $P_{kS}$. That is, an access probability can be used with a period of one frame.

Figure 4:
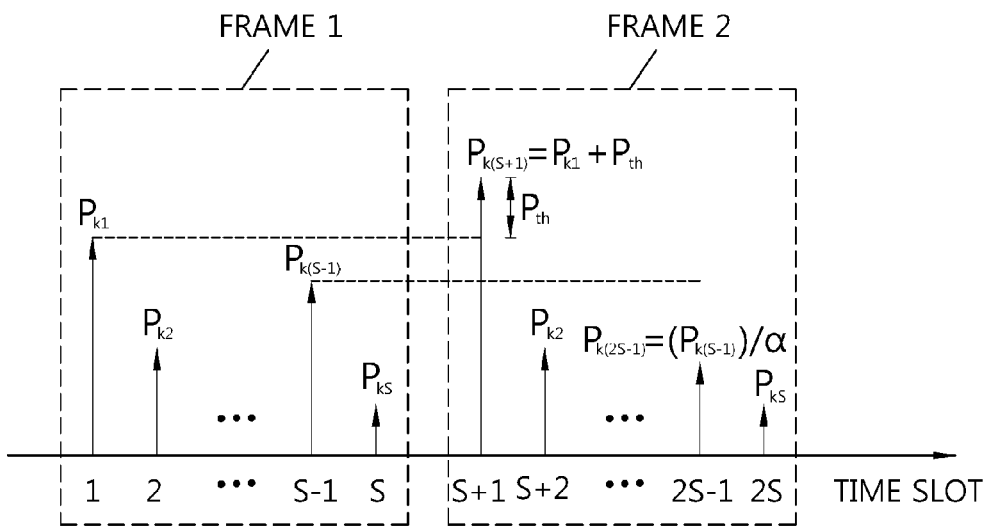
FIG. 4 shows an access probability changing in a next frame according to success/failure of data transmission when a UE attempts data transmission in one frame.

FIG. 4 shows an access probability changing in a next frame according to success/failure of data transmission when a UE attempts data transmission in one frame.

Referring to FIG. 4, for example, when the UE successfully transmits data in a time slot 1, i.e., a $1^{st}$ time slot of a frame 1, an access probability at a time slot S+1, i.e., a $1^{st}$ time slot of a frame 2, is increased. It can be seen in FIG. 4 that an access probability $P_{k(S+1)}$ at the time slot S+1 is increased to $P_{k1}+P_{th}$. Herein, $P_{th}$ denotes a predetermined increment. Otherwise, if data transmission at a time slot S−1, i.e., an $(S-1)^{th}$ time slot of the frame 1, is unsuccessful, an access probability at a time slot 2S−1, i.e., an $(S-1)^{th}$ time slot of the frame 2, is decreased. It can be seen in FIG. 4 that an access probability $P_{k(2S-1)}$ at the time slot 2S−1 is decreased to $(P_{k(S-1)})/\alpha$, where $\alpha>1$.

Figure 5:
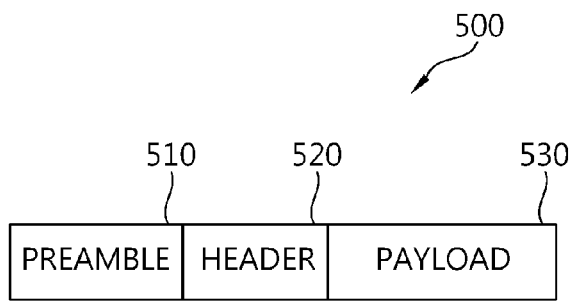
FIG. 5 shows an exemplary structure of data transmitted by a UE according to an embodiment of the present invention.

FIG. 5 shows an exemplary structure of data transmitted by a UE according to an embodiment of the present invention.

Referring to FIG. 5, data 500 transmitted by the UE may include a preamble 510, a header 520, and a payload 530. The preamble 510 may be predetermined such that different UEs use different preambles by using a higher layer signal or the like, or may be randomly selected from a set of preambles. The preamble may be used by a BS for channel estimation.

The header 520 contains information required for decoding of information stored in the payload 530. The payload 530 includes information or data to be transmitted by the UE to the BS.

Figure 6:
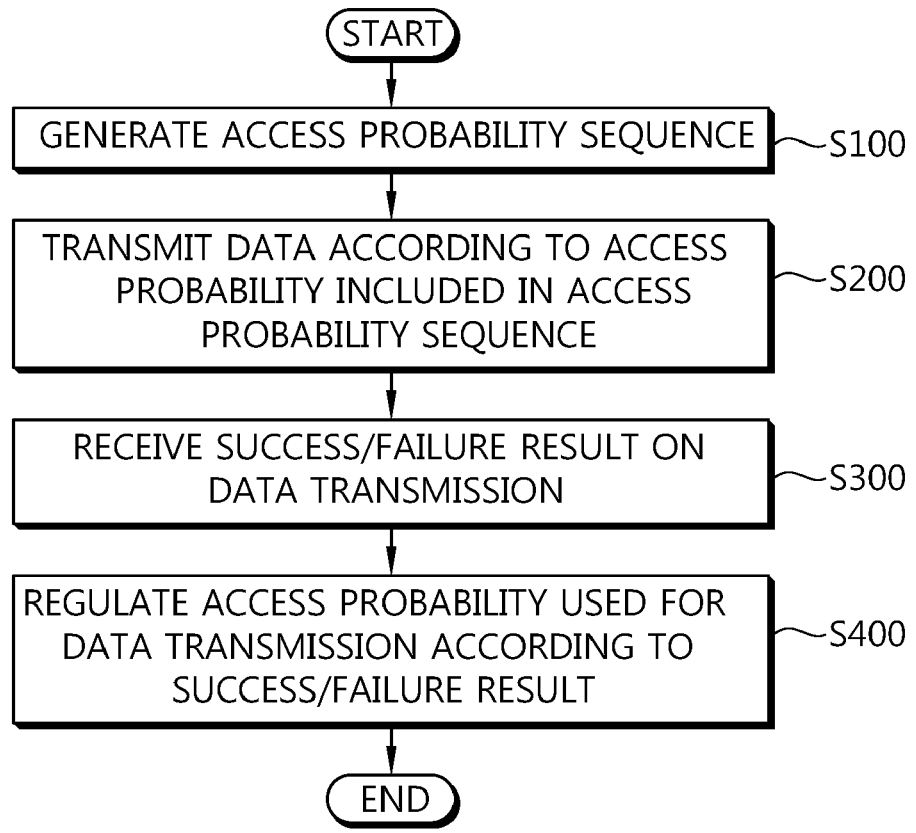
FIG. 6 is a flowchart showing a method of controlling uplink access of each UE according to an embodiment of the present invention.

FIG. 6 is a flowchart showing a method of controlling uplink access of each UE according to an embodiment of the present invention.

Referring to FIG. 6, a UE generates an access probability sequence including at least one access probability defined with respect to a radio resource used in data transmission (step S100). Initially, the UE may generate the access probability sequence randomly.

As described above, the radio resource used before data transmission may be a time slot, a frequency, a code, etc. For example, if the radio resource is the time slot, the UE generates the access probability sequence including access probabilities in the same number as the number of time slots constituting one frame. Then, the access probabilities are in association with the respective time slots.

The UE transmits data according to the access probability included in the access probability sequence (step S200). Since the UE transmits the data according to the access probability, the data may be transmitted or not transmitted at a specific time slot. If the data is not transmitted at the specific time slot, data transmission is attempted again at a next time slot according to a corresponding access probability.

If the UE transmits data 500 at a certain time slot, the UE receives from a BS a success/failure result on transmission of the data 500 (step S300). If the UE transmits the data 500, the BS transmits a success/failure result in response to transmission of the data 500 of the UE. For example, the BS estimates channel information by receiving the data 500 from each UE, determines whether reception is successful by using the estimated channel information and a multi-user receiver (e.g., a minimum mean square error (MMSE) receiver), and transmits the determination result to the UE either explicitly or implicitly.

If the BS transmits the reception success/failure result to the UE explicitly, in response thereto, the BS may transmit acknowledgement (ACK) to the UE for which data is successfully transmitted, and may transmit a negative acknowledgement (NACK) to a UE for which data transmission fails. Otherwise, if the BS transmits the reception success/failure result to the UE implicitly, the BS may transmit ACK only to a UE for which data transmission is successful, and a UE may regard data transmission as a failure when the UE fails to receive ACK within a specific time. In order to deliver information more accurately to UEs for which data transmission fails, ACK/NACK related information transmitted by the BS may include not only a data reception success/failure result of each UE but also additional information such as an identifier (ID) of a UE which performs channel access simultaneously with other UEs and for which data transmission is successful or fails.

The UE regulates an access probability used for the data transmission according to the success/failure result (step S400). If the UE transmits data in any time slot and receives ACK from the BS, an access probability for that time slot is increased. If the UE fails to receive ACK from the BS, the access probability for that time slot is decreased. The increased or decreased access probability is applied to the next frame.

Figure 7:
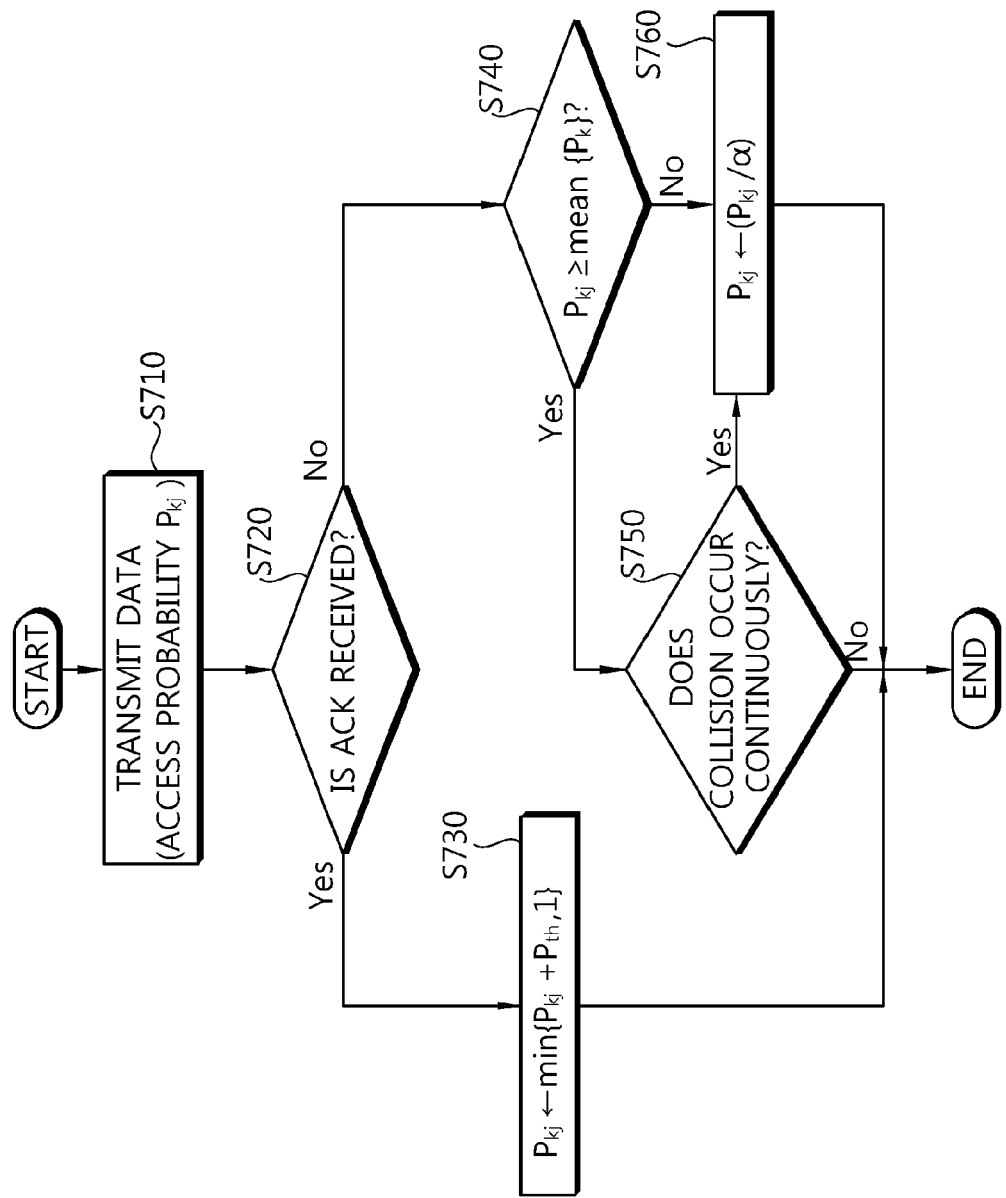
FIG. 7 is a flowchart showing a procedure of regulating an access probability according to an embodiment of the present invention.

FIG. 7 is a flowchart showing a procedure of regulating an access probability according to an embodiment of the present invention.

Referring to FIG. 7, a case where a UE transmits data according to an access probability $P_{kj}$, at a specific time slot, e.g., a $j^{th}$ time slot, is taken into consideration (step S710). If the UE does not transmit data in the $j^{th}$ time slot, an operation for the $j^{th}$ time slot is terminated to perform an operation of a next time slot, i.e., $(j+1)^{th}$ time slot.

If the UE transmits the data in the $j^{th}$ time slot, a success/failure result on the data transmission is determined, e.g., whether ACK is received is determined (step 720). When the UE receives ACK, it is a case where data transmission is successful in the $j^{th}$ time slot, and it can be determined that no collision occurs with other UEs. Therefore, the access probability of the $j^{th}$ time slot is regulated to be increased (step S730). The access probability can be increased by a predetermined value $P_{th}$. Once the access probability is increased, the increased access probability is applied to the same time slot of a next frame. For example, if an access probability at an $(S+1)^{th}$ time slot is denoted by $P_{k1}$ and data transmission is successful, an access probability of an $(2S+1)^{th}$ time slot may be updated to $P_{k1}+P_{th}$ (see FIG. 4). In this case, since the access probability cannot be greater than 1, the access probability is updated to a smaller value between 1 and $P_{k1}+P_{th}$.

If the UE transmits data at the $j^{th}$ time slot and fails to receive ACK, data transmission at the $j^{th}$ time slot can be regarded as a failure, and it can be seen that collision occurs at the $j^{th}$ time slot due to a high channel correlation with other UEs. Therefore, the access probability at the $j^{th}$ time slot is preferably regulated to be decreased.

However, for example, when two UEs transmit data at the same time slot and both of the two UEs fail to transmit the data to the BS due to a high channel correlation between the two UEs, there is a great possibility that no collision occurs at the same time slot of a next frame even if a access probability of only one UE is decreased. Preferably, a UE having a low access probability at a specific time slot between the two UEs is decreased. This is because, in doing so, a deviation of the access probabilities is further increased between the two UEs. In this sense, if the UE fails to transmit data at the $j^{th}$ time slot and thus decreases access probability, the UE determines whether the access probability at that time slot is greater than an average value of access probabilities (e.g., in case of a UE k, mean $\{P_k\}=((P_{k1}+P_{k2}+\ldots+P_{k(S-1)}+P_{kS})/S)$ for one frame (step S740). If the access probability of that time slot is less than the average value, the UE may decrease the access probability to $1/\alpha$ (where $\alpha$ is a specific value greater than 1) (step S760), and otherwise may maintain the access probability without change.

If the access probability of that time slot is greater than the average value of the access probabilities, whether data transmission fails contiguously is determined (step S750). If the data transmission fails contiguously, the access probability may be decreased. This is because it can be seen as a case where the access probability of that time slot is requested to be changed rapidly.

Figure 8:
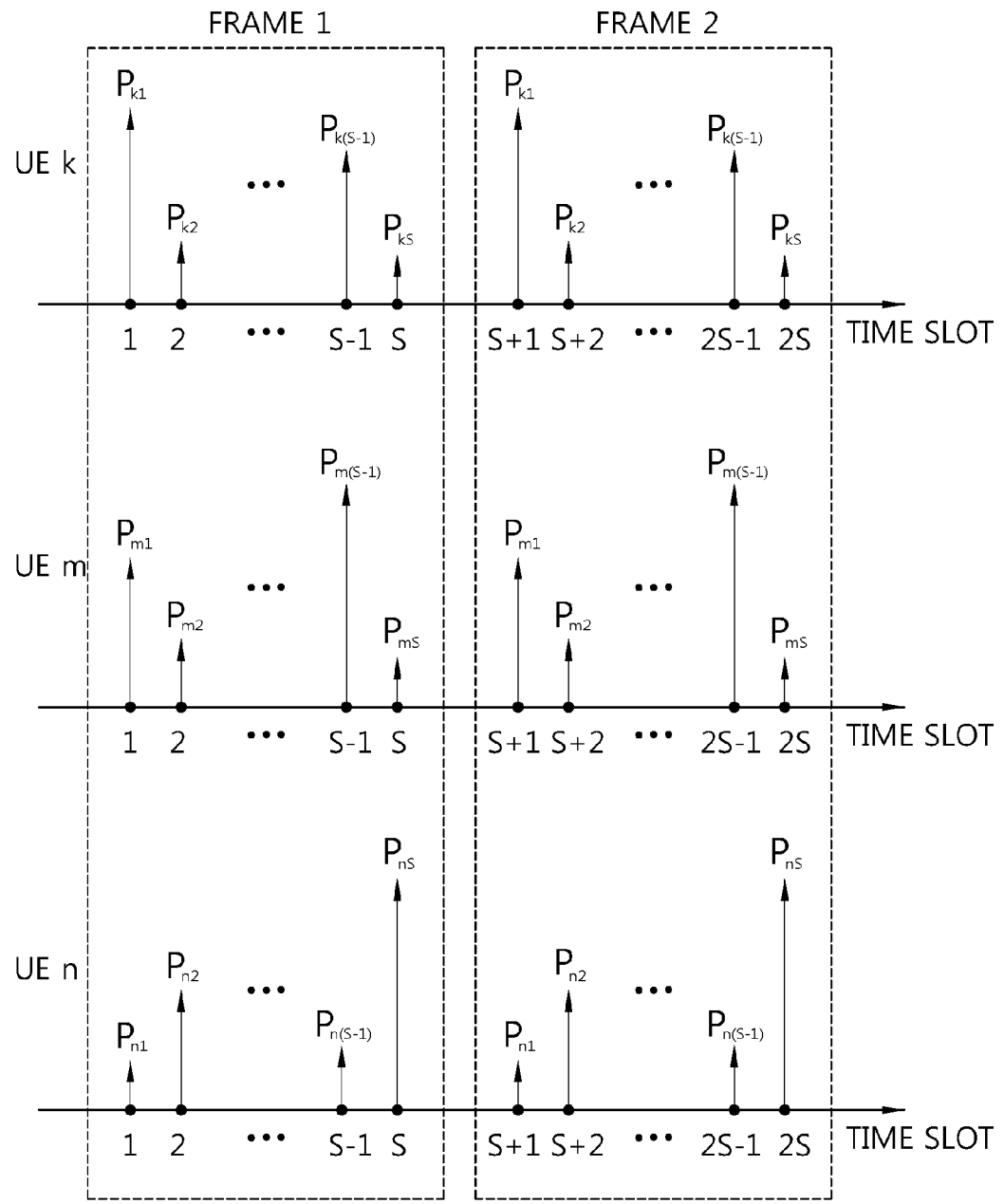
FIG. 8 is a diagram for comparing an access probability of each of a plurality of UEs after the access probability is regulated by each UE.

FIG. 8 is a diagram for comparing an access probability of each of a plurality of UEs after the access probability is regulated by each UE.

Referring to FIG. 8, a UE k and a UE m have a low channel correlation with each other, and have a low probability of collision occurrence even if they simultaneously transmit data to a BS. Therefore, when the UE k and the UE m respectively regulate their access probabilities, the access probabilities have a similar pattern as shown in FIG. 8. On the other hand, the UE k and a UE n have a high channel correlation with each other, and have a high probability of collision occurrence if they simultaneously transmit data to the BS. Therefore, when the UE k and the UE n respective regulate their access probabilities, access probability sequences are significantly different from each other as shown in FIG. 8. Likewise, access probability sequences of the UE m and the UE n are also significantly different from each other.

As described above, if each UE updates its access probability according to a success/failure result of data transmission at each time slot, a probability that UEs having a high channel correlation transmit data at the same time slot decreases, and a probability that UEs having a low channel correlation transmit data at the same time slot increases. As such, by simply regulating the access probability of each UE, an SDMA effect is generated.

Although it has been described above that the present invention applies to a system which directly transmits data, e.g., a slotted ALOHA system, the present invention is not limited thereto. That is, the present invention can also apply to a system which first determines whether a channel is currently used by another UE before data transmission, e.g., a carrier sense multiple access/collision avoidance (CSMA/CA) system. An example of applying the present invention to such a wireless system will be described hereinafter.

As described above, the CSMA/CA system is an example of a system for transmitting data after evaluating a channel state. In the CSMA/CA system, it is determined whether an output signal with a specific level or higher is detected in a frequency band at which a signal is to be currently transmitted before data transmission of each UE, and thus it can be determined whether a channel is currently used by another UE. A method of the present invention applied to such a system is characterized in that an access probability is regulated by controlling a decrement of a back-off counter.

Figure 9:
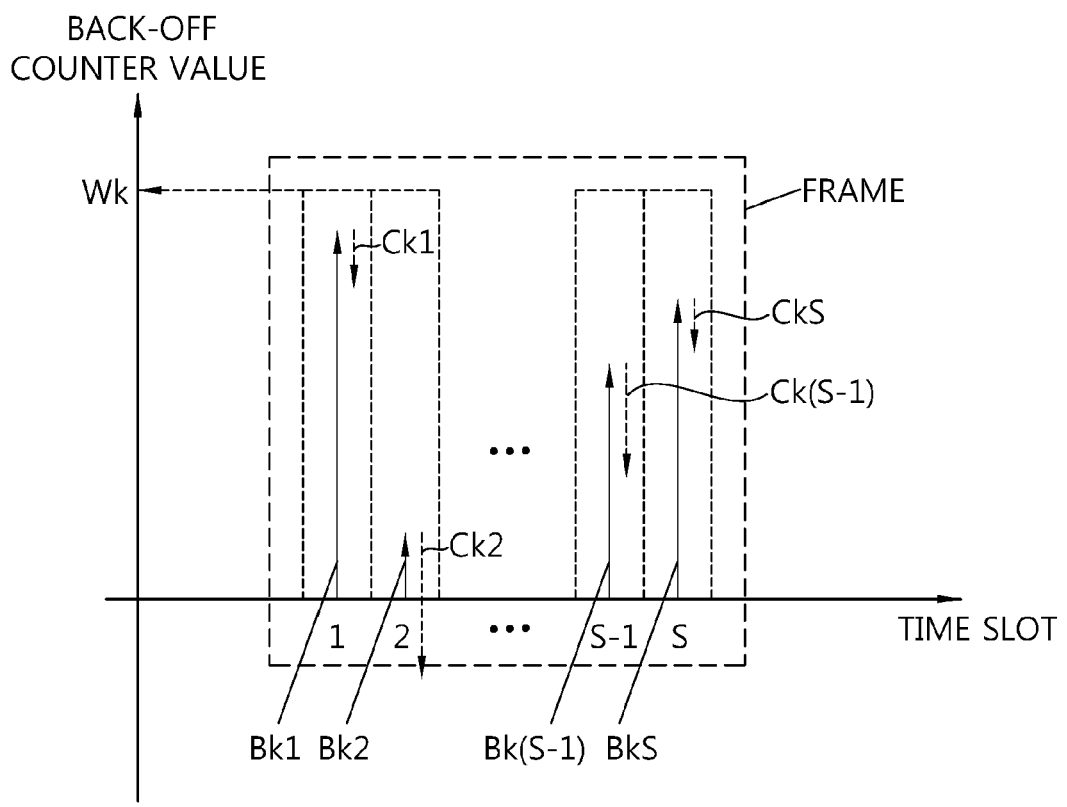
FIG. 9 is a diagram showing an example of determining a contention window, a back-off counter, and a decrement of the back-off counter in a time slot.

FIG. 9 is a diagram showing an example of determining a contention window, a back-off counter, and a decrement of the back-off counter in a time slot.

Referring to FIG. 9, each UE divides a frame into time slots, and determines a contention window in each time slot. A size of the contention window of any UE, e.g., a UE k, may be denoted by Wk. In Wk, k denotes that the contention widow is for the UE k.

The UE k randomly determines the back-off counter in the range of [0, (Wk)−1] in each of all time slots for one frame. In FIG. 9, back-off counters are denoted by $B_{k1}, B_{k2}, \ldots, B_{k(s-1)}, B_{kS}$. Further, the UE k may differently determine a decrement of the back-off counter of each of all time slots for one frame. In FIG. 9, the decrements of the respective back-off counters may be denoted by $C_{k1}, C_{k2}, \ldots, C_{k(S-1)}, C_{kS}$. Initially, these values may be randomly determined.

If the UE k does not perform data transmission in one frame, the contention window, the back-off counter, and the decrement of the back-off counter can be directly used in a next frame. That is, these values can be periodically used.

Figure 10:
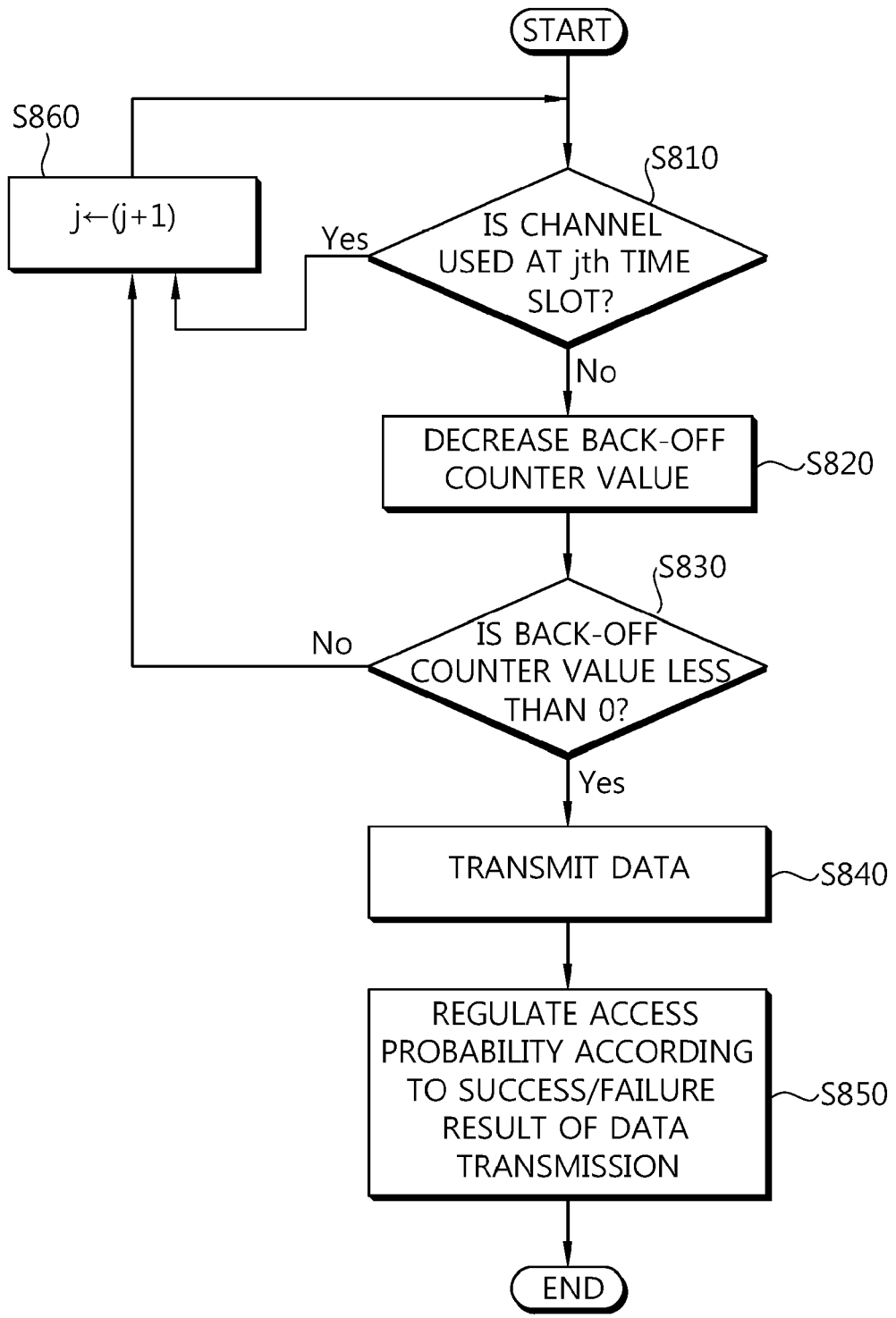
FIG. 10 is a flowchart showing a procedure of regulating an access probability in a time slot.

FIG. 10 is a flowchart showing a procedure of regulating an access probability in a time slot.

Referring to FIG. 10, if a UE k has data to be transmitted at a specific time slot, e.g., a $1^{st}$ slot time, it is determined whether a channel is used by a different UE at the $1^{st}$ time slot (step S810). If the determination result shows that the channel is not used, a back-off counter $B_{k1}$ of the $1^{st}$ time slot is decreased by $C_{k1}$ (step S820). It is determined whether the back-off counter of the $1^{st}$ time slot is less than 0 (step S830). If the back-off counter of the $1^{st}$ time slot is greater than 0, an operation of the $1^{st}$ time slot is terminated to perform an operation of a next slot, i.e., a $2^{nd}$ time slot (step S860).

If the back-off counter is less than 0 in step 830, the UE k transmits data (step S840). Then, the UE k regulates an access probability according to success/failure of data transmission (step S850).

If the back-off counter is less than 0 in the $2^{nd}$ slot time and thus the UE k successfully transmits data (e.g., if ACK is received from a BS), the UE k doubles $C_{k2}$ to increase an access probability of the $2^{nd}$ time slot. Doubling of $C_{k2}$ results in the increase of a probability that the back-off counter is less than 0 in the $2^{nd}$ time slot of a next frame, and thus it has the same meaning that the access probability of the $2^{nd}$ time slot is increased.

If the UE fails to transmit data in the $2^{nd}$ time slot (e.g., if ACK is not received from the BS), the UE k preferably decreases the access probability of the $2^{nd}$ time slot.

A method of decreasing the access probability of the $2^{nd}$ time slot can be implemented in various manners. For example, there is a method of simply decreasing $C_{k2}$. Or, there is a method of updating a decrement of the back-off counter and a size of the contention window for other time slots except for the $2^{nd}$ time slot. That is, the UE k may double the size of the contention window for all time slots, and may double the back-off counter and the decrement of the back-off counter for the remaining time slots other than the $2^{nd}$ time slot at which data transmission fails. As a result, an access probability is maintained in the remaining time slots other than the $2^{nd}$ time slot, and an access probability of the $2^{nd}$ time slot at which data transmission fails is decreased.

In addition, in a case where the UE fails to transmit data in a specific time slot, instead of decreasing an access probability of the time slot unconditionally, the access probability may be decreased only when data transmission fails continuously.

For example, when an average value of decrements of back-off counters of all time slots for one frame (i.e., mean$\{C_k\}=((C_{k1}+C_{k2}+\ldots+C_{k(S-)}+C_{kS})/S)$ is determined as a threshold, if a decrement of a back-off counter of a $j^{th}$ time slot at which data transmission fails is greater than the mean$\{C_k\}$, an access probability of the $j^{th}$ time slot can be decreased by using a method of decreasing $C_{kj}$ only when data transmission fails continuously.

As described above, in the system for directly transmitting data after evaluating the channel state, the method of the present invention can regulate an access probability by independently regulating a decrement of a back-off counter. When each UE regulates the decrement of the back-off counter according to a success/failure result of data transmission in each time slot, a probability that UEs having a high channel correlation transmit data at the same time slot decreases, and a probability that UEs having a low channel correlation transmit data at the same time slot increases. As such, by simply regulating the decrement of the back-off counter of each UE, an SDMA effect is generated.

Hereinafter, an example of applying the present invention to a system for transmitting data after exchanging a control signal among wireless systems will be described. The system for transmitting the data after exchanging the control signal may be a wireless local area network (WLAN) system. In the WLAN system, data can be transmitted after exchanging a control signal such as a request to send (RTS)/clear to send (CTS) signal.

The RTS signal may include a frame control field, a duration value field for setting a network allocation vector (NAV), an address field consisting of a receiver address (RA) and a transmitter address (TA), a frame check sequence field for detecting an error in frame contents, etc. The CTS signal may include a frame control field, a duration value field for setting or updating an NAV, an address field, a frame check sequence field, an ID of a UE transmitting the RTS, channel information, etc.

In the wireless system in which a BS and a UE transmit data after exchanging the RTS/CTS signal, the purpose of exchanging the RTS/CTS signal is to avoid collision occurrence with another UE. Therefore, if it is known that no collision occurs between a specific UE with a different UE, it is not mandatory to transmit data after exchanging the RTS/CTS signal.

Figure 11:
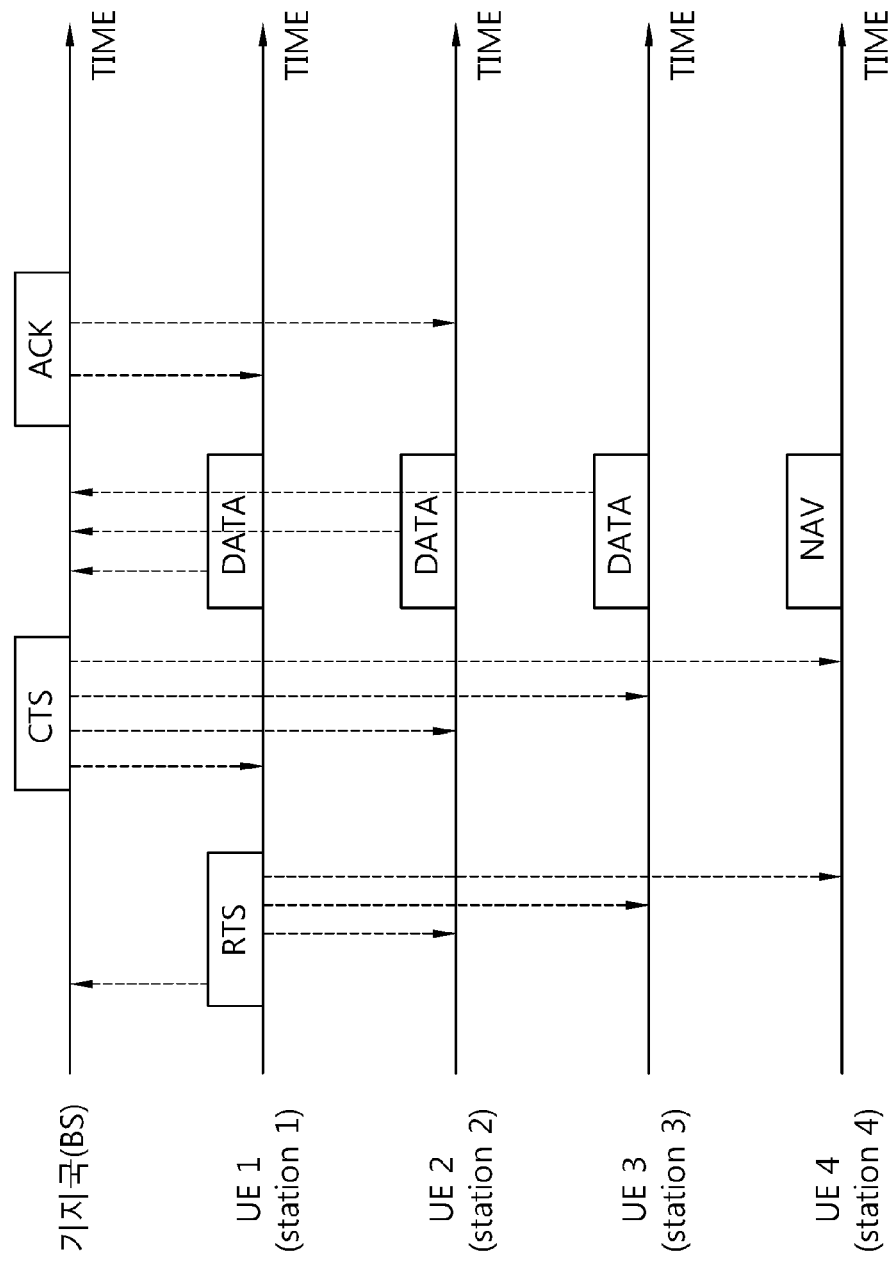
FIG. 11 is a diagram showing exchange of control signals and data between a plurality of UEs and a BS.

FIG. 11 is a diagram showing exchange of control signals and data between a plurality of UEs and a BS. In FIG. 11, the UEs are indicated by stations, and the BS is indicated by an AP.

Referring to FIG. 11, a UE1 transmits an RTS signal. It is assumed that the RTS signal is received by the BS and UEs 2, 3, and 4 which are neighbor UEs of the UE 1. The BS transmits a CTS signal in response to the RTS signal transmitted by the UE 1. If the BS transmits the CTS signal omni-directionally without performing beamforming, the UEs 1, 2, 3, and 4 can receive the CTS signal.

After receiving the CTS signal according to the conventional method, the UE 1 transmits data. On the other hand, the UEs 2, 3, and 4 may evaluate a channel correlation with respect to the UE 1 and thus may operate differently according to the channel correlation. The channel correlation may be obtained by a modulation and coding scheme (MCS) level, a channel quality indicator (CQI), a signal to noise ratio (SNR), and a signal to interference and noise ratio (SINR), or the like which can be obtained by a complex channel matrix. However, this is for exemplary purposes only, and thus other well-known method may also be used.

For example, it is assumed that the UE 2 and the UE 3 have a low channel correlation with the UE 1, and have a high channel correlation with the UE 4. Then, the UE 4 sets an NAV. The NAV is a type of counter existing in each UE, and has information indicating when a channel enters an idle state by referencing a duration field included in the CTS signal. The UE 4 does not access the channel until the NAV is less than 0. As a result, the UEs 1 and 4 having a high channel correlation do not simultaneously access the channel, thereby avoiding collision.

The UEs 2 and 3 have a low channel correlation with the UE 1, and thus can simultaneously transmit data during the UE 1 transmits data. Here, if a channel correlation is low between the UE 2 and the UE 3, no collision occurs even if the UE 2 and the UE 3 simultaneously transmit data, whereas collision may occur when the channel correlation is high between the UE 2 and the UE 3. It can be seen in FIG. 11 that the UE 2 successfully transmits data (i.e., ACK is received from the BS), whereas the UE 3 fails to transmit data (i.e., ACK is not received from the BS). Therefore, there is a need to regulate an access probability between the UE 2 and the UE 3.

Figure 12:
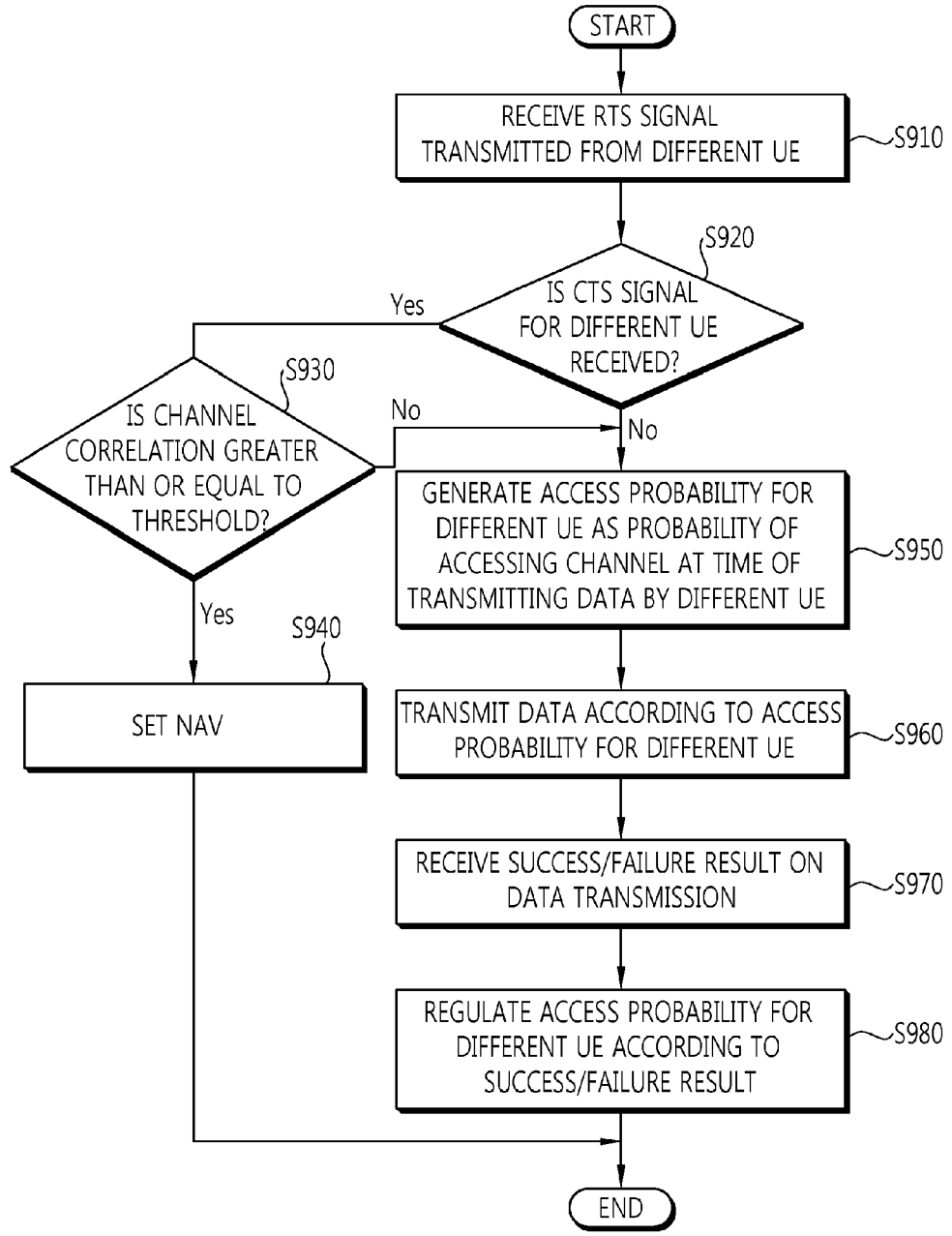
FIG. 12 is a flowchart showing a procedure of regulating an access probability of each UE in a system for transmitting data after exchanging a control signal.

FIG. 12 is a flowchart showing a procedure of regulating an access probability of each UE in a system for transmitting data after exchanging a control signal.

Referring to FIG. 12, a UE receives an RTS signal from a different neighbor UE (step S910). For example, if the UE 1 of FIG. 11 transmits an RTS signal omni-directionally, not only the BS but also the UEs 2, 3, and 4 can receive the RTS signal of the UE 1.

UEs (i.e., the UEs 2, 3, and 4) receiving the RTS signal from a different UE (i.e., the UE 1) determine whether a CTS signal is received for the different UE (i.e., the UE 1) (step S920).

When the UEs 2, 3, and 4 receive the CTS signal transmitted to the UE 1 by the BS, a channel correlation with the UE 1 is determined by using the CTS signal (step S930). Since the CTS signal includes an ID of a UE transmitting the RTS signal, channel state information, or the like, the UEs 2, 3, and 4 can determine the correlation with the UE 1 by using the CTS signal. (If the BS transmits the CTS signal in a direction of the UE transmitting the RTS signal by performing beamforming, a UE which receives an RTS signal of a different UE but fails to receive a CTS signal of the different UE can be regarded as a UE having a low correlation with the UE transmitting the RTS signal. For example, if the UEs 2 and 3 receive the RTS signal transmitted by the UE1 and fail to receive the CTS signal transmitted to the UE 1 by the BS by performing beamforming, the UEs 2 and 3 can be regarded as UEs having a low channel correlation with the UE 1.)

If each UE (i.e., the UEs 2, 3, and 4) determines that a channel correlation with the UE transmitting the RTS signal (i.e., the UE 1) is greater than or equal to a predetermined threshold, each UE (i.e., the UEs 2, 3, and 4) sets an NAV (step S940). For example, if the UE 4 of FIG. 11 determines that the channel correlation is greater than the threshold, the NAV is set. Therefore, no collision occurs between the UE 1 and the UE 4. On the other hand, the UE 2 and the UE 3 do not set the NAV since the channel correlation with the UE 1 is low.

Conventionally, each of all UEs receiving a CTS signal of a different UE sets the NAV. However, the present invention is different in that the NAV may either be set or not be set according to a channel correlation. Such a method of setting the NAV according to the present invention will be referred to as a selective NAV method.

If each UE determines that a channel correlation determined by receiving the CTS signal of the different UE (step S930) is less than a threshold or if each UE fails to receive the CTS signal of the different UE, each UE generates an access probability for the different UE as a probability of accessing a channel at a time of transmitting data by the different UE (step S950).

If the number of UEs is n, each UE generates the access probability for other UEs with respect to (n−1) UEs except for the UE itself. For convenience, the access probability for other UEs is expressed by $_k = \{_{k1k2k3} \cdots _{k(k-1)k(k+1)} \cdots _{kn}\}$. Herein, $_{k1}$ denotes an access probability of a UE k with respect to a UE 1, and $_{kn}$ denotes an access probability of the UE k with respect to a UE n. According to such an expression, the UE 2 generates an access probability $\{_{212324}\}$ for other UEs, and the UE 3 generates an access probability $_{\{313234\}}$ for other UEs.

Initially, each UE may randomly generate the access probability for a different UE. To generate the access probability for the different UE is to generate the access probability for the different UE according to each UE in a UE axis rather than generating of the access probability for time slots in a time axis. In other words, a UE have different access probabilities for different UEs.

Each UE transmits data according to the access probability for the different UE (step S960). For example, the UE 2 accesses a channel by using the access probability $_{21}$ for the UE 1 and transmits data. Further, the UE 3 accesses the channel by using the access probability $_{31}$ for the UE 1 and transmits data.

Upon transmitting the data, each UE receives a success/failure result on data transmission from the BS (step S970). According to the success/failure result on the data transmission, the access probability of each UE with respect to the different UE is regulated (step S980). As a method of regulating the access probability for the different UE, similarly to the aforementioned method of regulating the access probability, a method is used in which the access probability for the different UE is increased when data transmission is successful and the access probability for the different UE is decreased when data transmission fails. In FIG. 11, the UE 2 increases $_{21}$ since data transmission is successful, and the UE 3 decreases $_{31}$ since data transmission fails. Although the access probability is provided in the time axis or the UE axis in the above description, the access probability may also be provided for each frequency or code.

The present invention can be applied by determining the access probability according to each of situations where multiple accesses are possible. For example, the present invention may apply to transmission of a random access preamble in a random access procedure. The random access procedure is used when uplink synchronization is not achieved by the UE with respect to the BS, or when the UE transmits data to the BS in a situation where there is no uplink radio resource. The UE can perform the random access procedure on the BS in the following cases.

(1) When the UE performs initial access since there is no RRC connection with the BS.

(2) When the UE first accesses to a target cell in a handover procedure.

(3) When it is requested by the command of the BS.

(4) When uplink data is generated in a condition where uplink time alignment is not adjusted or where uplink radio resource is not allocated.

(5) When a recovery procedure is performed due to radio link failure or handover failure.

The random access procedure can be classified into a contention based random access procedure and a non-contention based random access procedure. A greatest difference between the two random access procedures lies in whether a random access preamble is dedicatedly assigned to one UE. In the non-contention based access procedure, since a UE uses only the random access preamble dedicatedly assigned to the UE, contention (or collision) with another UE does not occur. The contention occurs when two or more UEs attempt the random access procedure by using the same random access preamble through the same resource. In the contention based random access procedure, there is a possibility of collision since a random access preamble used by the UEs is randomly selected.

The random access procedure can be performed much faster if a collision probability of the random access preamble is reduced. Therefore, the random access procedure may be further effective when the access probability is applied to transmission of the random access preamble.

Although transmission of a random access preamble in $3^{rd}$ generation partnership project (3GPP) long term evolution (LTE) will be described hereinafter, this is for exemplary purposes only. Thus, technical features of the present invention can also apply to other system. The 3GPP LTE is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE.

Figure 13:
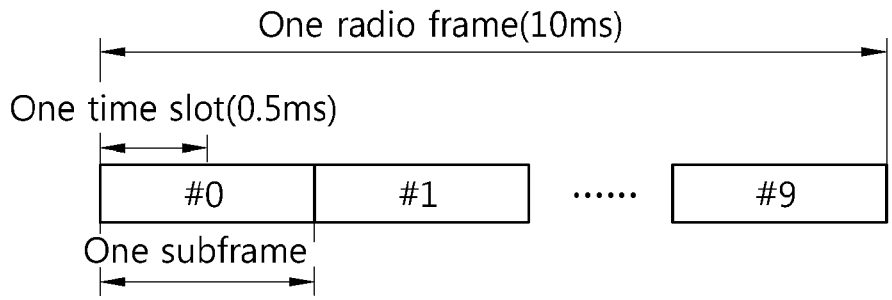
FIG. 13 shows a frequency division duplex (FDD) radio frame structure in a $3^{rd}$ generation partnership project (3GPP) long term evolution (LTE) system.

FIG. 13 shows a frequency division duplex (FDD) radio frame structure in a 3GPP LTE system. The section 4.1 of 3GPP TS 36.211 V8.4.0 (2008-09) "Technical Specification Group Radio Access Network; Evolved Universal Terrestrial Radio Access (E-UTRA); Physical Channels and Modulation (Release 8)" may be incorporated herein by reference. The radio frame consists of 10 subframes. One subframe consists of two slots. A time required to transmit one subframe is defined as a transmission time interval (TTI). For example, one subframe may have a length of 1 millisecond (ms), and one slot may have a length of 0.5 ms. In the radio frame, a subframe number of a $1^{st}$ subframe is 0, and a subframe number of a last subframe is 9.

One slot includes a plurality of orthogonal frequency division multiplexing (OFDM) symbols in a time domain and includes a plurality of subcarriers in a frequency domain. The OFDM symbol is for expressing one symbol period since the 3GPP LTE uses OFDMA in a downlink. According to a system, the OFDM symbol may be referred to as an SC-FDMA symbol or a symbol period. A resource block (RB) is a resource allocation unit, and includes a plurality of consecutive subcarriers in one slot.

The radio frame of FIG. 13 is shown for exemplary purposes only. Thus, the number of subframes included in the radio frame or the number of slots included in the subframe, or the number of OFDM symbols included in the slot may change variously.

Figure 14:
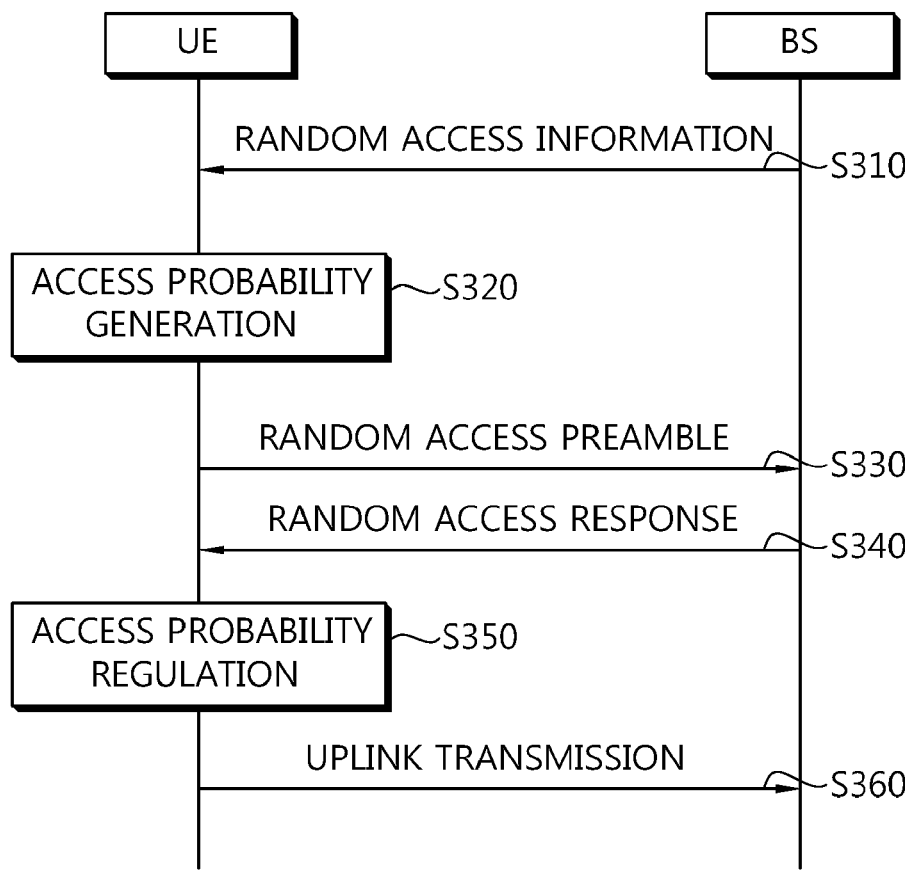
FIG. 14 is a flowchart showing a random access procedure according to an embodiment of the present invention.

FIG. 14 is a flowchart showing a random access procedure according to an embodiment of the present invention. A UE receives random access information from a BS (step S310). The random access information is information for transmission of the random access preamble. The random access information may include information for generating a physical random access channel (PRACH) resource and/or a random access preamble set. Further, the random access information may include information on access probability generation and/or access probability regulation. The random access information may be transmitted by using a part of system information, a radio resource control (RRC) message, and/or a downlink control channel.

Figure 15:
FIG. 15 shows a random access preamble format.

FIG. 15 shows a random access preamble format. The random access preamble consists of a cyclic prefix (CP) with a length of $T_{CP}$ and a random access sequence with a length of $T_{SEQ}$. The length $T_{CP}$ and the length $T_{SEQ}$ are determined by the random access preamble format.

Table 1 below shows the length $T_{CP}$ and the length $T_{SEQ}$ according to the random access preamble format. In Table 1, Ts is 1/(15000×2048) second.

TABLE 1

| Preamble format | $T_{CP}$ | $T_{SEQ}$ |
| --- | --- | --- |
| 0 | 3168 * $T_s$ | 24576 * $T_s$ |
| 1 | 21024 * $T_s$ | 24576 * $T_s$ |
| 2 | 6240 * $T_s$ | 2 * 24576 * $T_s$ |
| 3 | 21024 * $T_s$ | 2 * 24576 * $T_s$ |
| 4(frame structure type 2 only) | 448 * $T_s$ | 4096 * $T_s$ |

A PRACH resource is a time/frequency resource used for transmission of the random access preamble. The BS indicates the random access frame format and a subframe number by using a PRACH configuration index. Table 2 below shows the PRACH resource according to the PRACH configuration index.

TABLE 2

| PRACH Configuration Index | Preamble Format | System frame number | Subframe number | PRACH configuration index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| 11 | 0 | Any | 3, 6, 9 | 43 | 2 | Any | 3, 6, 9 |
| 12 | 0 | Any | 0, 2, 4, 6, 8 | 44 | 2 | Any | 0, 2, 4, 6, 8 |
| 13 | 0 | Any | 1, 3, 5, 7, 9 | 45 | 2 | Any | 1, 3, 5, 7, 9 |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

Figure 16:
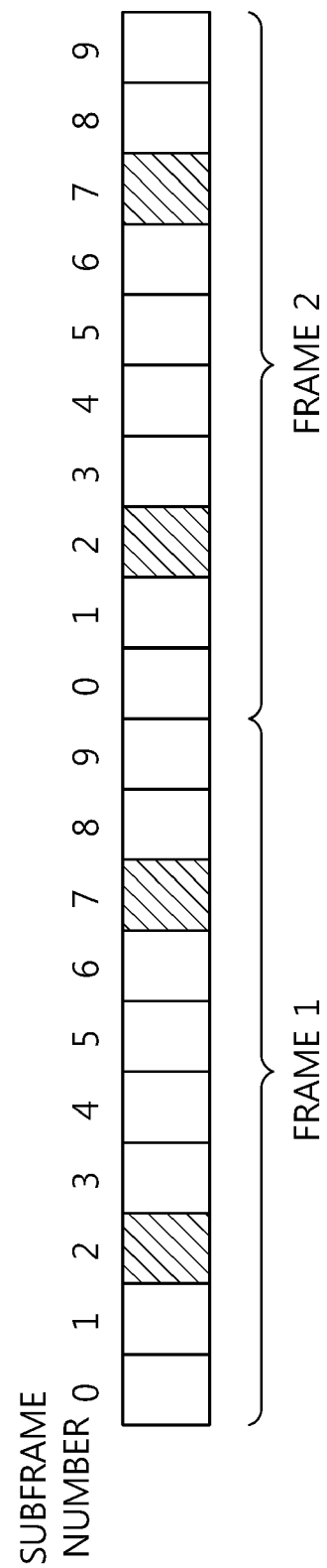
FIG. 16 shows transmission of a random access preamble when a physical random access channel (PRACH) configuration index is 7

FIG. 16 shows transmission of a random access preamble when a PRACH configuration index is 7. When the PRACH configuration index is 7, a UE can transmit the random access preamble at subframe numbers 2 and 7. That is, the UE transmits the random access preamble by using a subframe randomly selected by the UE from the subframes having the subframe numbers 2 and 7 of each radio frame. Therefore, if the subframes with the subframe numbers 2 and 7 correspond to time slots for the aforementioned access probability, the access probability may be determined for each subframe, and an access probability sequence with a length of 2 may be defined for one radio frame. Alternatively, the access probability sequence may be defined across a plurality of radio frames.

Referring back to FIG. 14, the UE generates an access probability sequence by using random access information (step S320). The UE generates the access probability sequence corresponding to subframe(s) capable of transmitting the random access preamble in the radio frame.

The UE transmits the random access preamble to the BS by using the PRACH resource according to the access probability generated in each time slot (step S330). The UE randomly selects one random access sequence belonging to a random access preamble set and transmits the random access preamble at the subframe selected according to the access probability.

The UE may receive a random access response in response to the random access preamble (step S340). The random access response may be transmitted through a downlink shared channel (DL-SCH). The random access response may include at least one of timing alignment information, an initial uplink grant, and a temporary cell-radio network temporary identifier (C-RNTI). The timing alignment information is timing correction information for uplink transmission. The initial uplink grant is information on a resource used by a UE attempting channel access so as to initially perform scheduled transmission in an uplink. The temporary C-RNTI is a C-RNTI which may not be permanent until collision is solved.

According to whether the UE receives the random access response, the UE may regulate an access probability of a specific subframe (step S350). Further, the UE performs scheduled uplink transmission through a UL-SCH (step S360).

Although an access probability for a subframe is applied among PRACH resources in the above description, the access probability may also apply to a frequency resource for sending the random access preamble among the PRACH resources. For example, the access probability can be defined for each frequency resource in a frequency resource set such as f={f1, f2, f3, ... fN}.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of controlling uplink access in a wireless communication system, the method comprising:
   generating an access probability sequence consisting of an access probability determined with respect to a radio resource used for data transmission;
   transmitting data according to the access probability included in the access probability sequence;
   receiving a success/failure result on the data transmission; and
   regulating the access probability used in the data transmission according to the success/failure result,
   wherein the radio resource comprises any one of at least one time slot, frequency, and code,
   wherein the access probability is determined by a back-off counter value and a back-off counter decrement value independently controlled in each time slot, and
   wherein the back-off counter value means a value for admitting data transmission in a time slot if the back-off counter value is less than a specific value, and the back-off counter decrement value means a value for decreasing the back-off counter value if a channel is not used at the time slot.

2. The method of claim 1, wherein the access probability used in the data transmission is increased when the data transmission is successful, whereas the access probability used in the data transmission is decreased when the data transmission fails.

3. The method of claim 2, wherein, when the data transmission fails, the access probability used in the data transmission is decreased if the access probability used in the data transmission is less than a predetermined value.

4. The method of claim 3, wherein, when the data transmission fails, the access probability used in the data transmission is decreased if the access probability used in the data transmission is greater than the predetermined value and the data transmission fails contiguously.

5. The method of claim 1, wherein the data is a random access preamble, and the radio resource is a physical random access channel (PRACH) resource used for transmission of the random access preamble.

6. The method of claim 5, wherein the success/failure result on the data transmission is determined according to whether a random access response is received in response to the random access preamble.

7. A method of controlling uplink access in a wireless local area network (WLAN) system, the method comprising: determining whether a clear-to-send (CTS) signal is received; if the CTS signal is received, determining a channel correlation with a different user equipment by using the CTS signal; generating an access probability for the different user equipment as a probability of accessing a channel at a time of transmitting data by the different user equipment according to the channel correlation; and transmitting the data according to the access probability for the different user equipment.

8. The method of claim 7, wherein the access probability for the different user equipment is generated when the channel correlation is less than a threshold.

9. The method of claim 7, further comprising, if the channel correlation is greater than a threshold, setting a network allocation vector (NAV).

10. The method of claim 7, further comprising, before the determining of whether the CTS signal is received, receiving a request-to-send (RTS) signal transmitted by the different user equipment.

11. The method of claim 10, further comprising, if the CTS signal is not received: generating an access probability for the different user equipment as a probability of accessing to a channel at a time of transmitting data by the different user equipment; and transmitting a data according to the access probability for the different user equipment.

12. The method of claim 7, further comprising: receiving a success/failure result on the data transmission; and regulating the access probability for the different user equipment used in the data transmission according to the success/failure result.

* * * * *